Dec. 31, 1968   C. J. HURBIS   3,418,862
REGENERATOR DRIVE
Filed March 1, 1967
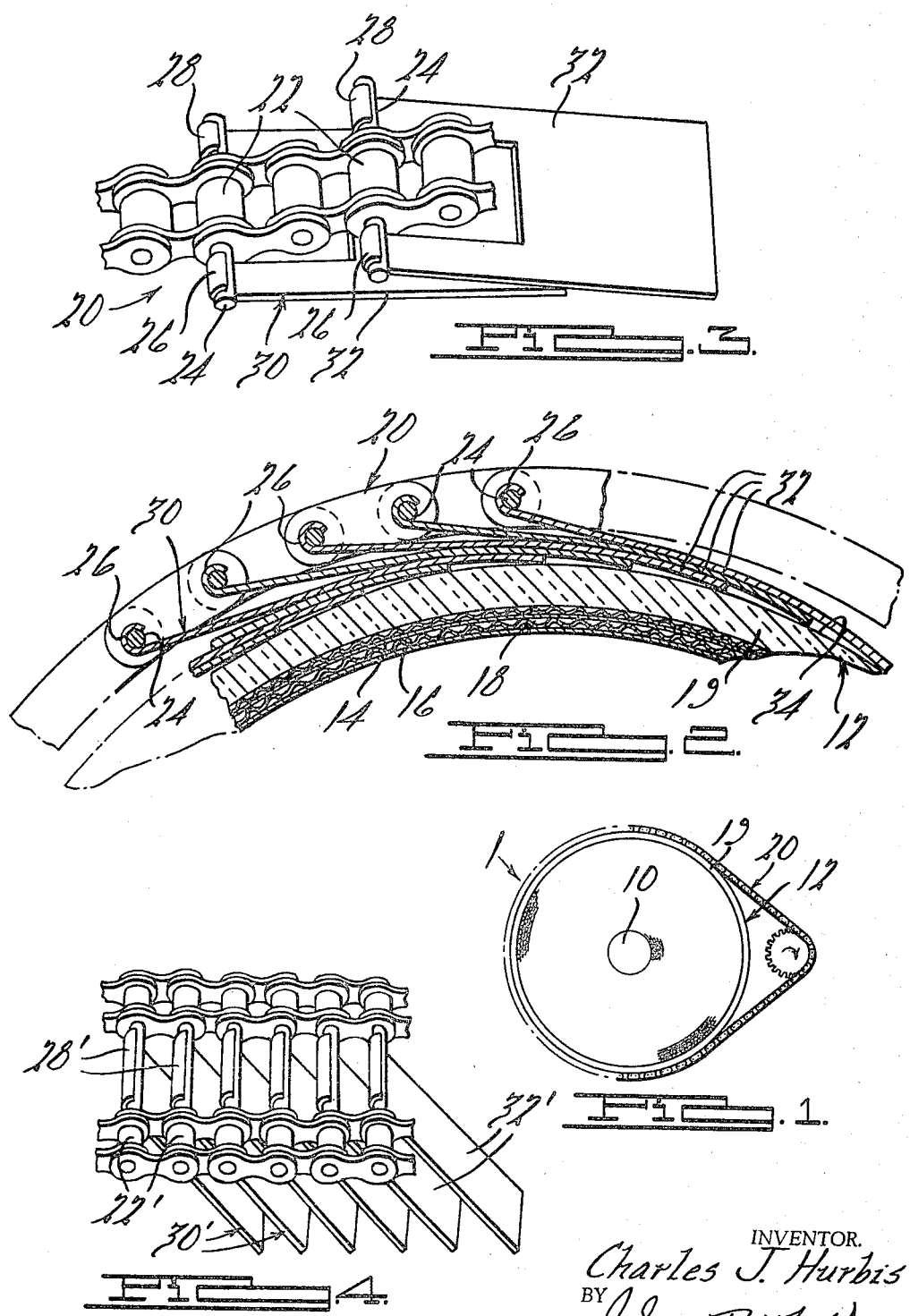
INVENTOR.
Charles J. Hurbis
BY
John R. Faulkner
Robert E. McCollum

United States Patent Office 3,418,862
Patented Dec. 31, 1968

3,418,862
REGENERATOR DRIVE
Charles J. Hurbis, Livonia, Mich., assignor to Ford Motor Company, Dearborn, Mich., a corporation of Delaware
Filed Mar. 1, 1967, Ser. No. 619,737
7 Claims. (Cl. 74—229)

ABSTRACT OF THE DISCLOSURE

A disc type rotary heat exchanger driven frictionally by a number of circumferentially overlapping leaf-like springs that at one end frictionally abut the heat exchanger matrix, and at their other ends are connected to a metal drive chain spacedly surrounding the matrix, the springs being preloaded against the matrix during assembly of the chain around the matrix to provide sufficient frictional force to cause a unitary movement of the chain and matrix.

---

This invention relates to a drive mechanism for a rotary member. More particularly, it relates to a driving mechanism for a rotary heat exchanger or regenerator of the disc type that is commonly used in gas turbine engines installed in motor vehicles.

The recent development of ceramic rotary regenerators has pointed out a need for the redesign of the drive assembly for rotating the regenerator matrix, due to the brittle characteristics of ceramic. Metallic rotary heat exchangers generally are driven by a metallic ring gear or similar device such as a chain fixed to the outer periphery of the disc-like regenerator matrix. This same drive, however, is not necessarily practical for a ceramic regenerator. Ceramic has a low rate of thermal expansion as compared to metal. Therefore, the differential expansion is large between a metal driving member fixed rigidly on a thick cast ceramic rim, for example. Unfavorable stresses can develop that can crack the ceramic rim and cause failure of the regenerator.

The invention eliminates the above disadvantages by providing a regenerator drive member that has essentially a floating frictional connection to the outer periphery of the ceramic regenerator, and one that evenly distributes the contact stresses and permits radial growth essentially without stressing the regenerator matrix. More particularly, the invention consists of an annular metallic drive chain that is frictionally engaged with the outer surface or rim of a ceramic rotary heat enchanger through a plurality of flat sheet spring clips. The clips are anchored to the chain and preloaded by bending during assembly of the chain around the regenerator in a manner to frictionally engage the regenerator surface with sufficient force to provide a unitary movement of both the chain and the regenerator. The clips also maintain the drive chain radially spaced from the regenerator to permit radial growth between the two.

It is an object of the invention, therefore, to provide a friction drive of a rotary member.

It is also an object of the invention to provide a drive assembly for a rotary disc type heat exchanger that consists of an annular drive member that is frictionally connected to the rotary regenerator matrix by a number of spring clips.

It is still a further object of the invention to provide a drive of the type described above in which the spring clips are essentially flat leaf-like springs that are hooked at one end to the drive member and frictionally bear against the outer periphery of the regenerator matrix at their other ends; and, are prestressed or preloaded by bending during assembly of the driving member around the regenerator matrix to frictionally bear against the regenerator matrix with a force sufficient to provide a unitary movement of the driving member and the regenerator in either direction.

Other objects, features and advantages of the invention will become apparent upon reference to the succeeding detailed description thereof, and to the drawings illustrating the preferred embodiments thereof, wherein:

FIGURE 1 is a side elevational view of a rotary regenerator embodying the invention;

FIGURE 2 is an enlarged portion of the FIGURE 1 showing;

FIGURE 3 is a perspective view of a portion of the driving mechanism illustrated in FIGURE 1; and, FIGURE 4 is a perspective view of another embodiment of the invention.

FIGURE 1 shows a rotary heat exchanger 2 of the disc type commonly used in regenerative type gas turbine engines installed in motor vehicles. The regenerator usually would be positioned between the compressor and combustion sections of the engine to preheat the compressor discharge air by the turbine exhaust gases prior to the air entering the combustion chamber, for better fuel economy.

By way of background, a regenerator such as that shown in FIGURE 1, and partially in FIGURE 2, is generally constructed to rotate, say, about a stationary shaft 10. The matrix 12 of the regenerator generally would be made up of a number of narrow bands of thin flat ceramic or metal strips 14, separated by an equal width corrugated ceramic or metal strip 16. The strips together form axial flow passages 18 for the passage therethrough of either the hot, gas turbine low pressure turbine exhaust gases, or the low temperature, high pressure compressor discharge air. FIGURES 1 and 2 illustrate a ceramic regenerator wheel having a thick cast ceramic outer rim 19.

The regenerator would be mounted with suitable stationary seals and ducting (not shown) so as to effectively divide the regenerator wheel into two halves, or upper and lower chamber portions. The hot turbine exhaust gases, for example, would flow in one direction through the upper half portion of the axial flow passages as the regenerator rotates, the passage walls absorbing the heat. As the regenerator wheel rotates through the bottom half cycle, the high pressure, low temperature compressor discharge air would pass in the opposite direction through the same axial flow passages, in a known manner, the air absorbing the heat from the now warmed passage walls. Thus, the overall effect is that the turbine hot gases give up a portion of their waste heat to the lower temperaure compressor discharge air as the regenerator wheel rotates through its entire cycle.

Radially spaced from and surrounding matrix 12 is an annular driving element 20, which, in this case, is a single sprocket type metal chain. A portion of the chain is shown more clearly in FIGURE 3. The details of construction of the chain per se are known and, therefore, are not given since they are believed to be unnecessary for an understanding of the invention. Suffice it to say, however, that, in this case, alternate rollers 22 of the chain are provided with pin extensions 24 that are adapted to be engaged by the hook-like ends 28 of a number of leaf-like drive spring clips 30. FIGURE 4 shows an alternate dual sprocket type chain construction. In this case, the hook ends 28' of the springs clips 30' are engaged around intermediate pins connecting the spaced rollers 22' of the chain.

Each drive clip 30 is of a similar construction. It includes a flat thin metal, flexible strip portion 32 that, in its unstressed or free state, normally would be straight and extend essentially in a radial direction, as shown in FIGURE 4, towards the regenerator wheel. The driving chain would be of a diameter and total circumferential extent such that when assembled to the regenerator wheel, the chain would be radially spaced from the wheel, but the radial spacing would be less than the free radial extent of the clips. The assembly, therefore, causes the clips to circumferentially overlap and thereby be bent, compressed or preloaded to each frictionally bear against the matrix outer rim periphery 34, and one another, as best indicated in FIGURE 2. The prestressing force, of course, would be chosen to provide the frictional force necessary to provide a unitary movement between the chain and regenerator wheel upon rotation of either in either direction. It will be clear also that the clips are spaced circumferentially close enough to provide the above action.

The operation of the drive assembly is believed to be clear from the above description. Due to the fixing of the hooked ends 28 of the clips around the pin extensions or rollers 22, the flat portions 32 of the clips must flex to the shapes shown in FIGURE 2 upon assembly of the chain to the regenerator matrix, thus providing a frictional engagement of the end of the drive clips on the regenerator matrix periphery with a force sufficient to provide a unitary drive between the two members.

It should be noted that with the frictional engagement type of drive provided, an overrunning action can occur between the chain drive and the matrix in the event the matrix is locked from turning, for one reason or another. That is, the preload force of the springs on the matrix surface is sufficient to provide a drive of the matrix under normal load conditions. Under abnormal loads, however, the chain can slip counterclockwise relative to the matrix to prevent damage to the matrix.

From the foregoing, it will be seen that as the chain is wrapped around the regenerator, the drive clips assume the shape of the wheel diameter and provide the contact necessary to drive. It will also be seen that this drive mechanism has particular advantages when used in conjunction with ceramic type heat exchangers because the flexible clips compensate for relative dimensional changes that occur between the ceramic wheel and the metal chain due to changes in temperature. Also, the flexibility of the clips provides for a large contact area with the regenerator wheel, thereby providing low contact pressures, which is particularly important when the fragile nature of the ceramic wheel is considered.

While the invention has been illustrated and described in its preferred embodiments, it will be clear to those skilled in the arts to which the invention pertains that many changes and modifications may be made thereto without departing from the scope of the invention.

I claim:

1. A drive assembly comprising a cylindrical-like rotatable member, a rotatable driving member axially aligned with and radially spaced from and overlying a substantial portion of said rotatable member, and flexible means between said members, said latter means comprising a plurality of spring means each having one end connected to said driving member and the other end abutting a peripheral surface of said rotatable member, the adjacent abutting end portions of said spring means being in overlapping relationship with each other, and said driving member having a diameter relative to that of said rotatable member such that assembly of said driving member around said rotatable member flexes and preloads the overlapping abutting end portions of said spring means against said surface for a frictional interconnection between said members.

2. A drive assembly as in claim 1, with each of said spring means being in the form of a flexible flat sheet spring and being circumferentially spaced from each other and frictionally engaging separate portions of said rotatable member surface.

3. A drive assembly as in claim 2, the overlapping end portions of said springs overlapping in a circumferential direction.

4. A drive assembly as in claim 3, the mutually adjacent overlapping ends of said springs frictionally engaging each other in the assembled condition of said driving member around said rotatable member.

5. A driving assembly comprising, a rotatable disc-like member, an annular rotatable driving member surroundingly mounted with respect to said disc-like member and axially aligned therewith, and spring clip means between said members for transmitting a rotation of said driving member to said disc-like member, said clip means comprising a plurality of flat sheet flexible springs circumferentially arranged between said members in an overlapping manner and each having one end frictionally abutting the peripheral surface of said disc-like member means securing the opposite ends of said springs to said driving member for a movement therewith, the diameter of said driving member relative to that of said surface being such that assembly of said members and clip means flexes and compresses said overlapping clip means ends against each other and said surface with a frictional preload sufficient to provide a unitary rotation of said members.

6. A driving mechanism as in claim 5, each of said springs including a hook portion secured to a portion of said drivng member.

7. A driving mechanism as in claim 5, each of said springs in its free state extending radially between said members a greater distance than the radial distance between said members in their assembled state.

References Cited

UNITED STATES PATENTS

| | | | |
|---|---|---|---|
| 595,051 | 12/1897 | Elieson | 74—229 |
| 2,551,578 | 5/1951 | Bendall | 74—229 |
| 3,276,515 | 10/1966 | Whitfield | 165—10 |

FRED C. MATTERN, Jr., *Primary Examiner.*

J. A. WONG, *Assistant Examiner.*

U.S. Cl. X.R.

74—235; 165—8